United States Patent Office 3,326,546
Patented June 20, 1967

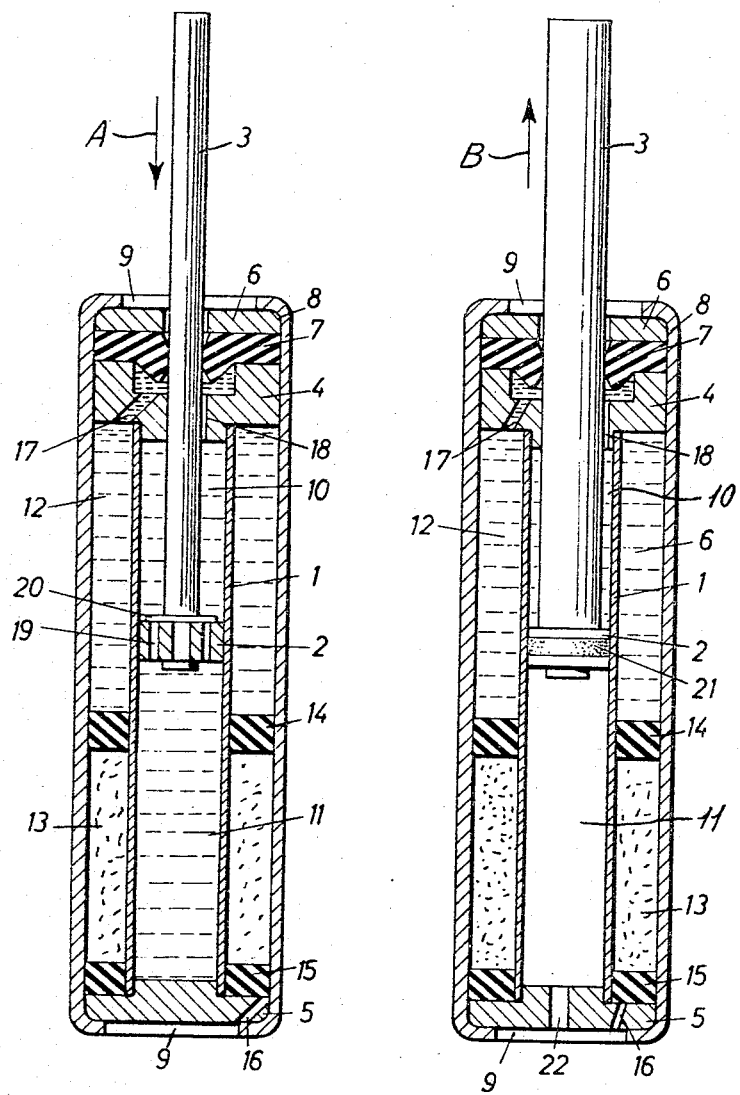

3,326,546
HYDROPNEUMATIC CYLINDER ARRANGEMENT
Günter Otto, 13 Umgehungsstrasse,
7060 Schorndorf, Germany
Filed July 7, 1965, Ser. No. 470,299
Claims priority, application Germany, July 10, 1964,
O 10,251
19 Claims. (Cl. 267—64)

The present invention relates to a hydropneumatic piston cylinder arrangement consisting of two concentric, liquid-filled and gas-filled cylinders with the outer cylinder having a means for sealing off the gas from the liquid and the inner cylinder having a piston slidably mounted therein.

Hydropneumatic piston cylinder arrangements consisting of two concentric cylinders and a piston axially movable within the inner cylinder are well known. The outer cylinder is generally divided by an axially movable sealing ring into two operating chambers. One of the chambers in the outer cylinder is filled with gas and the other is filled with liquid. In contradistinction to the filling of the outer cylinder, the inner cylinder has two operating chambers, defined by the piston both filled with liquid.

The well known hydropneumatic piston cylinders have several basic disadvantages. One of the disadvantages concerns the fastening of the two cylinders to each other. Second, the outer cylinder requires a seal between the gas and the liquid. Further, the direction of actuation of the pressure in the operating chamber of the two cylinders is not capable of taking up substantial forces in pressure and therefore can be used only as a shock absorber.

It is therefore an object of the present invention to overcome the deficiencies of the previously known devices and to provide a hydropneumatic piston cylinder arrangement which, while retaining the greatest possible reliability, permits absorption of large forces of pressure.

It is a further object of the invention to provide a hydropneumatic piston cylinder arrangement which is capable, with only minor modifications of a few parts, of carrying out many entirely different and highly useful functions.

The latter object is accomplished by constructing the piston and the bottom cover in such a way that the piston cylinder arrangement may be used as a compression spring, a tension spring, or as a device for measuring fluid pressure (hydroment).

According to the preferred embodiment of the invention, the working portion of the inner cylinder is connected to the working portion of the outer cylinder by means of channels. The channels are located in the piston rod guide member fixed to the top end of the piston cylinder arrangement. The working space of the outer cylinder is filled with a fluid.

According to another preferred embodiment, the working spaces of the outer cylinder are separated from one another by an annular gasket capable of axial movement. Complete expansion of the gas in one portion of the outer cylinder would move said gasket a sufficient distance to seal the transfer channels. The sealing of the transfer channels prevents the escape of gas from the outer cylinder which, of course, would affect the operation of the piston arrangement.

A further embodiment of the invention features a filling hole in the base cover of the piston cylinder arrangement through which the amount of gas in a working chamber of the outer cylinder can be varied.

The action of the working portions of the two cylinders can be joined in series so that, upon destruction of the gasket separating the gas and the fluid, the piston will be driven into the inner cylinder.

In preparing the piston cylinder arrangement for use as a compression spring, it is advantageous to provide the arrangement with a piston which has boreholes therein. The piston would have to be further provided with a valve plate which works together with the boreholes. The resistance of the piston to the fluid in the two directions of flow can be varied greatly by suitably adjusting the valve. As a rule, the resistance of the piston to fluid flow in the inner cylinder is less upon insertion of the piston than on extraction of the piston from the cylinder.

In accordance with another embodiment, when the arrangement is intended for use as a tension spring, the piston is provided at its circumference with an annular seal. The piston is also placed under the influence of atmospheric air pressure through an opening in the bottom cover which allows atmospheric pressure to act on the lower side of the piston.

In accordance with another embodiment, the piston cylinder arrangement may be used as a fluid pressure measuring device or hydroment. In such use, one side of the piston is put under the influence of a liquid under pressure via an opening located in the bottom cover in a manner similar to using the invention as a tension spring.

The means by which the foregoing objects and other advantages, which will be apparent to those skilled in the art, are accomplished are set forth in the following specification and claims and are illustrated in the accompanying drawings dealing with a basic and an alternate embodiment of the present invention. Reference is made now to the drawings in which:

FIG. 1 is a section through a hydropneumatic piston cylinder arrangement being used as a compression spring;

FIG. 2 is a section through a hydropneumatic piston cylinder arrangement for use as a tension spring.

Referring now to FIG. 1 the hydropneumatic piston cylinder arrangement comprises an inner cylinder 1 having an axially displaceable piston 2 and piston rod 3 mounted therein. The inner cylinder rests with its upper and lower ends in sealing engagement with a guide member 4 and a bottom cover 5 respectively. An annular gasket 7 is clamped fast between the guide member 4 and a top cover plate 6. The piston rod 3 passes through both the gasket 7, in sealing relation, and the top cover 6. An outer cylinder 8 is made concentric with the inner cylinder 1 by engagement with top cover 6, gasket 7, guide member 4 and bottom cover 5. The outer cylinder has cover openings 9 at either end. The piston 2 divides the inner cylinder 1 into two operating chambers 10 and 11. The outer cylinder also has two operating chambers 12 and 13 divided by an axially displaceable annular packing or gasket 14. The operating chambers 10, 11 and 12 are filled with a hydraulic liquid while the chamber 13 is filled with gas under pressure. The liquid in operating chamber 12 and the gas in operating chamber 13 are separated from each other by the above-mentioned axially displaceable annular packing or gasket 14 which must be impermeable to both the gas and the liquid. Another annular packing or gasket 15, inside the bottom cover 5, seals off the two operating chambers 11 and 13 from each other and from the outside atmosphere. The bottom cover 5 is provided with an opening 16 for the introduction of gas under pressure to the chamber 13. Channels 17 and 18 in the guide member 4 provide a fluid connection between the operating chambers 10 and 12.

When using the hydropneumatic piston cylinder arrangement in accordance with the invention as a compression spring, as shown in FIG. 1, the piston 2 is provided with brake boreholes 19 and a valve plate 20 which cooperates with the boreholes.

When using the invention as a tension spring, in accordance with the embodiment illustrated in FIG. 2, the piston bears on its outer periphery an annular packing 21 and the bottom cover 5 is provided with an opening 22 which places chamber 11 in communication with the atmosphere.

The operation of the invention as a hydropneumatic compression spring is as follows:

Upon the exertion of an external compressive force, noted by the arrow A, on the piston rod 3, the piston 2 is caused to be moved inwardly towards the operating chamber 11 of the inner cylinder. The hydraulic fluid from chamber 11 will flow through the boreholes 19 as the piston 2 moves to the operating chamber 10. A certain volume of fluid will be displaced by the additional length of piston rod 3 now within chamber 10. The displaced fluid will flow, via channels 17 and 18 in the guide member 4, out of the operating chamber 10 into the operating chamber 12. The additional fluid in chamber 12 causes an axial displacement of the annular packing gasket 14 thereby compressing the gas in the operating chamber 13 of the outer cylinder 8. When the action of the compressive forces on the piston rod 3 are eliminated, the gas in chamber 13 will expand thereby reversing course of the aforementioned movements and fluid flows. The piston is forced outwardly on the inner cylinder 1 towards its initial position.

A piston cylinder arrangement, in accordance with the invention may operate as a hydropneumatic tension spring in the following manner:

Under the action of external traction force, noted by arrow B, acting on the piston rod 3, the piston 2 is pulled outwardly of the inner cylinder 1. The piston is in sealing engagement with the inner cylinder 1 by means of annular packing 21. The fluid in the operating chamber 10 of the inner cylinder 1 will be forced to flow through channels 17 and 18 to the operating chamber 12 of the outer cylinder 8. The additional fluid in the operating chamber 12 causes the annular packing gasket 14 to be displaced axially with the resulting compression of the gas in the operating chamber 13. Upon removal of the external traction force from the piston rod 3, the entire sequence of movement and fluid flow described above is carried out in reverse order as a result of the expansion of the gas in working chamber 13. The expanding gas causes the piston rod 3 and piston 2 to be moved toward their initial position within the inner cylinder 1. An opening 22 is provided in bottom cover 5 which serves to prevent a vacuum from forming in the operating chamber 11 when the piston 2 is moved in the direction of arrow B. The bottom of the piston 2 is thus continuously in communication with atmospheric pressure.

The piston cylinder arrangement in accordance with the invention may serve as a pressure measuring device or hydroment, as follows: a liquid under pressure is introduced, via the opening 22, into the operating chamber 11 of the inner cylinder 1. The liquid will exert a force on the piston rod 3 out of the inner cylinder 1 in the direction of arrow B. When the force of the liquid present in the operating chamber 11 of the inner cylinder is removed, the piston 2, due to the expansion of the gas in chamber 13, which was compressed on the operating stroke of the piston, moves back towards its initial position.

From the foregoing, it is clear that the invention has a great advantage in that it is only necessary to have a feed line for the liquid under pressure. No return line need be provided since the return stroke of the piston rod 3 is effective by re-expansion of the previously compressed pressure gas. The return line for the pressure liquid which is otherwise necessary in hydraulic systems can thus be dispensed with.

The subject matter of the invention has great advantage in that it combines in an entirely novel and effective manner, in one single unit, three devices which are entirely different in function. A slight modification of only two structural parts, namely, the piston and the bottom cover, allows simple conversion of the inventive hydropneumatic cylinder arrangement to use either as a compression spring, a tension spring, or as a hydroment. The advantages resulting therefrom with respect to cost of manufacture, interchangeability of individual parts, etc. are clear. Furthermore, a piston cylinder arrangement, in accordance with the invention, is substantially free of maintenance and wear, which may frequently be of decisive importance with respect to the possibility of use in difficult situations such as inaccessible locations.

Another advantage of the invention resides in its integral, compact construction. This also makes it possible to handle large forces even with a unit of relatively small structural size.

Upon complete expansion of the pressure gas in the operating chamber 13, the annular packing 14 is pressed firmly against the guide piece 4 thereby sealing off channel 17. Thus the escape of gas from the chamber 13 with its resulting action on the piston 2 is avoided. Even in case of destruction of the packing 14, as a result of the special arrangement of the operating chambers of the two cylinders 1 and 8, the possibility of the piston rod 3 being forced entirely out of the inner cylinder 1 under the expansion of the pressure gas is avoided. The piston rod is rather forced into the inner cylinder 1 so that there is no danger of persons standing in the vicinity of the invention being injured.

By suitable selection of the operating volumes of the inner and outer cylinder, it is possible to produce entirely different force absorbing characteristics.

Through the opening 16 present in the bottom cover 5, gas under pressure may easily be introduced into the operating chamber 13 so that the operation characteristics of the invention can be altered very rapidly and simply to the compressive or tractive forces corresponding to the specific use.

In certain cases, it may be advantageous to use a valve plate 20 which cooperates with the openings in the piston 2 so that the resistance of the piston 2 to fluid flow differs for the two directions of movement. The opening 22 present in the bottom cover 5 allows access to the piston 2 from outside the unit so that a bar or other suitable means may be introduced to pretension the unit when used as a tension spring.

The invention may be embodied in other specific forms without departing from the spirit or essential characteristics thereof. The present embodiment therefore is to be considered in all respects as illustrative and not restrictive, the scope of the invention being indicated by the appended claims rather than the foregoing description, and all changes which come within the meaning and range of equivalency of the claims are therefore to be embraced herein.

What is claimed is:

1. A hydropneumatic piston cylinder arrangement comprising two concentric cylinders, a piston slidably mounted within said inner cylinder defining therein first and second chambers, an axially movable gasket in said outer cylinder defining therein first and second chambers, a top cover and a bottom cover respectively sealing the outer ends of said chambers, channel means in said top cover interconnecting said first chambers, gas under pressure filling said second chamber of said outer cylinder, a hydraulic fluid filling said first chambers, and means connected to said piston and extending through said top cover.

2. A hydropneumatic piston cylinder arrangement according to claim 1 wherein said second chamber in said inner cylinder is filled with a hydraulic fluid, boreholes in said piston, a valve plate mounted on said piston, and said hydropneumatic piston cylinder arrangement being used as a compression spring.

3. A hydropneumatic piston cylinder arrangement according to claim 1 wherein an opening is provided in said bottom cover connecting said second chamber of said inner cylinder to the atmosphere, an annular sealing gasket mounted on said piston, said hydropneumatic piston arrangement being used as a tension spring.

4. A hydropneumatic piston cylinder arrangement according to claim 1 wherein an opening is provided in said bottom cover, said opening being connected to a source of fluid under pressure, said hydropneumatic piston cylinder arrangement being used for a hydroment.

5. A hydropneumatic piston cylinder arrangement comprising two concentric liquid filled and gas filled cylinders, means for sealing off the liquid from the gas in the outer cylinder thereby defining two chambers therein, a piston slidably mounted in said inner cylinder separating the liquid from the gas and defining two chambers therein; a top and a bottom cover sealing the outer ends of both said cylinders, rod means attached to said piston and extending through said top cover.

6. A hydropneumatic piston cylinder arrangement according to claim 5 further comprising channel means placing the liquid filled chamber of the inner cylinder in communication with the liquid filled chamber of the outer cylinder.

7. A hydropneumatic piston cylinder arrangement according to claim 6 wherein the channel means are arranged in the top cover.

8. A hydropneumatic piston cylinder arrangement according to claim 5 wherein the chambers of the outer cylinder are separated by an axially movable annular packing gasket, said gasket upon full expansion of the gas sealing off the channel means in said top cover whereby escape of the gas from the outer cylinder into the inner cylinder is prevented.

9. A hydropneumatic piston cylinder arrangement according to claim 8 wherein a filling means is provided in said bottom cover, said means allowing the quantity of gas in the gas filled chamber of the outer cylinder to be changed.

10. A hydropneumatic piston cylinder arrangement according to claim 9 wherein an annular packing gasket seals off the gas filled chamber of the outer cylinder from the inner cylinder, said annular packing simultaneously sealing off the filling means thus preventing communication of the gas with the atmosphere.

11. A hydropneumatic piston cylinder arrangement according to claim 5 wherein the operating chambers of the two cylinders are so connected to each other that on destruction of the annular gasket between the chambers of the outer cylinder the piston is forced to the bottom of the inner cylinder.

12. A hydropneumatic piston cylinder arrangement according to claim 5 wherein when the arrangement is used as a compression spring, the gas in the gas filled chamber of the outer cylinder is compressed by the displacement of the piston.

13. A hydropneumatic piston cylinder arrangement according to claim 5 wherein brake boreholes are provided in said piston.

14. A hydropneumatic piston cylinder arrangement according to claim 13 wherein a valve plate is attached to the piston, said valve plate cooperating with the boreholes to determine the flow resistance of the piston to the liquid.

15. A hydropneumatic piston cylinder arrangement according to claim 14 wherein the flow resistance of the piston is less upon an inward stroke than a withdrawing stroke.

16. A hydropneumatic piston cylinder arrangement according to claim 5 wherein an annular packing is provided on the periphery of said piston when the arrangement is used as a tension spring.

17. A hydropneumatic piston cylinder arrangement according to claim 16 wherein an opening is provided in said bottom cover.

18. A hydropneumatic piston cylinder arrangement according to claim 17 wherein said tension spring may be pretensioned by means inserted through the opening in the bottom cover to force the piston out of the inner cylinder.

19. A hydropneumatic piston cylinder arrangement according to claim 5 wherein an opening is provided in the bottom cover, said opening being placed in communication with a liquid under pressure thereby utilizing the piston cylinder arrangement as a hydroment.

No references cited.

ARTHUR L. LA POINT, *Primary Examiner.*

R. M. WOHLFARTH, *Assistant Examiner.*